Oct. 14, 1958  G. E. COMSTOCK 3D  2,855,688
MICROMETER ADJUSTER
Filed July 11, 1955
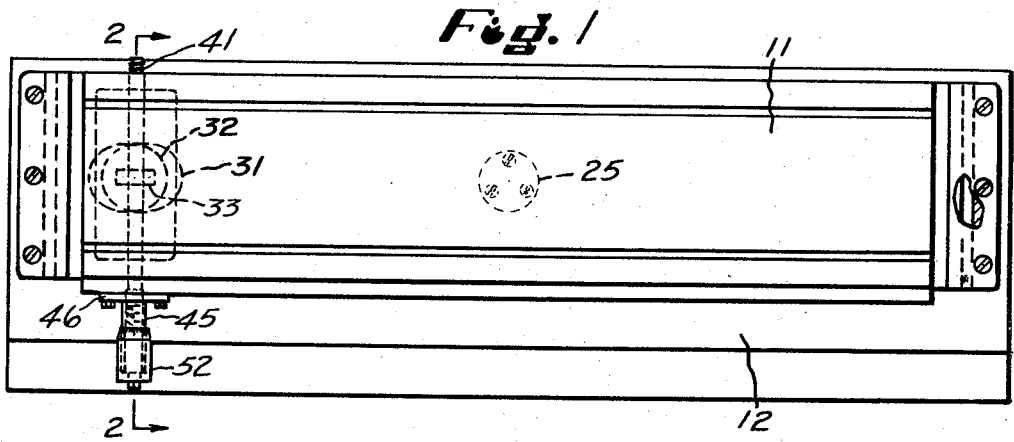
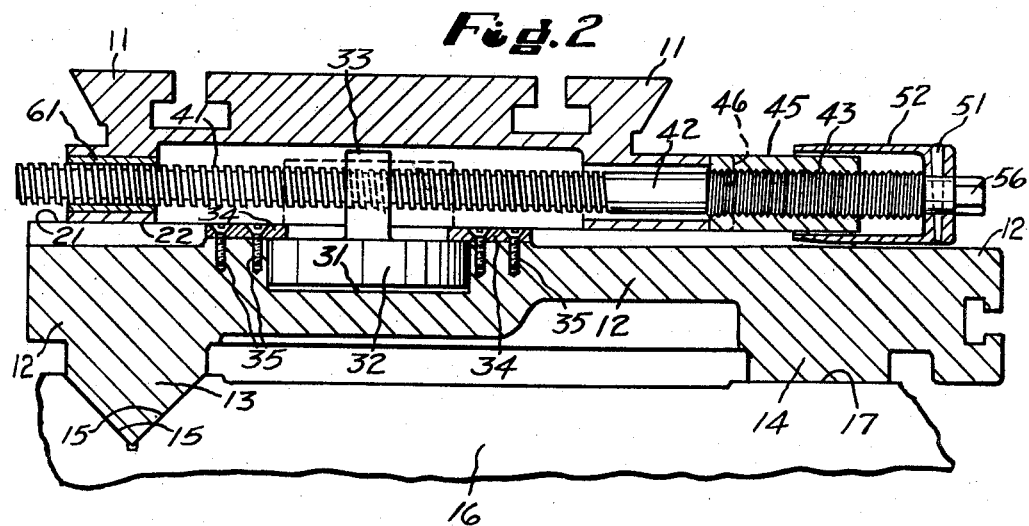
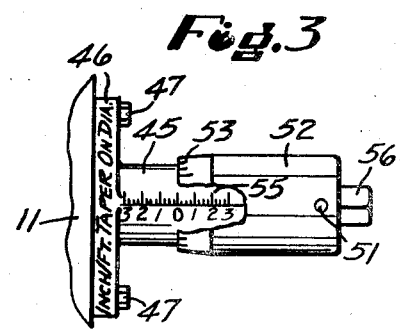
INVENTOR.
GEORGE E. COMSTOCK 3rd.
BY
ATTORNEY

United States Patent Office 2,855,688
Patented Oct. 14, 1958

2,855,688

MICROMETER ADJUSTER

George E. Comstock, 3d, Holden, Mass., assignor to Norton Company, Worcester, Mass., a corporation of Massachusetts Application July 11, 1955, Serial No. 521,237

2 Claims. (Cl. 33—174)

The invention relates to micrometer adjusters.

One object of the invention is to provide a micrometer adjuster which gives an immediate reading of the position of adjustment. Another object of the invention is to provide an adjuster of accurate dependable construction. Another object of the invention is to provide an adjuster of simple construction. Another object of the invention is to provide a micrometer adjuster in combination with a connection for swiveling a table or other machine element. Another object of the invention is to provide a micrometer adjuster in which a movement of the thimble along the scale gives greater movement to the part being adjusted. Another object is to provide an adjuster for the swivel table of a grinder having a scale which can be located at the headstock end (where table swivel results in less deflection because there is more mass at that end) and which can be embodied in a compact device. Scales under the headstock are hard to read and therefore it has hitherto been usual to locate the adjusting screw at the tailstock end with the disadvantage of more deflection of the table than if it were at the headstock end.

Other objects will be in part obvious or in part pointed out hereinafter.

In the accompanying drawings illustrating one of many possible embodiments of the micrometer adjuster, Figure 1 is a plan view of a swivel table for a machine tool illustrating the adjuster applied thereto, Figure 2 is a vertical sectional view on an enlarged scale taken on the line 2—2 of Figure 1, Figure 3 is a plan view of the thimble, the sleeve and the scale of the adjuster.

Referring first to Figure 2, a swivel table 11 is shown mounted upon a carriage 12 having a V-shaped bottom sliding supporting portion 13 which in the usual case extends for most of the length of the carriage 12 and a flat bottom supporting portion 14 which in the usual case likewise extends for most of the length of the carriage 12. The portion 13 rests in V-ways 15 of the base 16 of the machine tool which may be a grinder, and the portion 14 rests on a flat way 17 of the base 16. The upper portion of the carriage 12 has flat horizontal surfaces such as the surface 21, which may be in the same plane as each other or not as desired, and complementary flat surfaces such as the surface 22 rest thereon. A pivotal connection indicated at 25 in Figure 1 but not illustrated in detail connects the table 11 and the carriage 12 for angular adjustment of the former on the latter. All of this is standard machine tool construction, it may be varied at will without affecting the present invention, and has been sufficiently described to show one application of the present invention which is not limited to the adjustment of a table on a carriage.

Formed in the upper surface of the carriage 12 is a depression 31 having equidistant sides merging into circular ends but so long as the sides extend far enough to allow the relative motion required the shape of the ends is actually immaterial, but circular ends are easy to machine.

The internal walls of the depression 31 are shown as vertical and plane, but other shapes could be adopted. In this depression 31 fits a disc portion 32 integral with a nut 33 which illustratively and conveniently is in the shape of a rectangular parallelepiped. The disc 32 fits the depression nicely but allowing both sliding and angular movement in the depression. In order to prevent cramping and binding I preferably provide gibs 34 overlapping the outer edges of the top of the disc 32 and secured to the carriage 12 by means of screws 35. These gibs 34 may be straight rectangular pieces as it is sufficient to hold the disc 32 down in the depression at points under the axis of the bore in the nut 33 as the forces tending to tip it are exerted along such axis. The gibs 34 will not so tightly hold the disc 32 as to prevent it from turning and sliding.

The nut portion 33 has a rather large thread mating with a screw thread 41 of a long screw shaft 42. The pitch of the thread 41 and the mating thread in the nut 33 is relatively coarse, relative that is to say to a thread 43 extending almost to the right hand end of the screw shaft 42. The thread 43 mates with a complementary thread in a sleeve nut 45. Referring now to Figure 3, the sleeve nut 45 has a flange 46 by means of which it is secured to the table 11 with bolts 47.

Referring to all of the figures, secured to the outer end of the screw shaft 42 by means of a taper pin 51 is a thimble 52 having graduations 53 at its inner end. The sleeve 45 has graduations 55 and preferably these are numbered as shown both sides of zero for swivel adjustment forward and back, zero representing no swivel so that a machining operation will produce no taper. Desirably the end of the shaft 42 projects beyond the thimble 52 and has a bolt head for turning of the shaft 42 by means of a wrench or a crank, illustratively a hex head 56. The left hand end of the screw shaft 42 extends through a bearing 61 in the table 11 and for that reason the thread 41 preferably has an outer cylindrical surface being what is called, not quite accurately, a square thread.

The sleeve nut 45, the thimble 52 and the shaft 42 with its thread 43 constitute the actuating elements of a micrometer caliper. Rotation of the thimble 52 causes the left hand end thereof to move forward (considered to be to the left, Figure 3) or backward over the graduations 55 depending upon the direction of rotation. These graduations 55, whole numbers of which illustratively represent inches per foot taper on the diameter, are read and interpolated by reading the graduations 53 on the center line of the graduations 55, just as in the case of micrometer calipers.

The resultant movement of the table 11 is the algebraic sum of the two components of linear movement thereof. When the threads 41 and 43 are of opposite hand, the components are added and when they are of the same hand the components are subtracted. It will generally be preferred to have the threads of the opposite hand so that the components will be added. This condition is shown in Figure 2. As the result of making the values of the components additive, a given taper adjustment can be effected with a smaller angular movement of the thimble 52 than would be the case if linear motion alone of the shaft 42 were relied upon to move the table 11, as would be the case if screw shaft 42 were connected to the carriage 12 by means of a collar.

By means of the connection of the nut 33 to the carriage 12 through the slidable disc 32, rectilinear motion is translated into angular motion. By reason of this same connection because the disc 32 is rotatable the axis of the nut 32 remains in alignment with the axis of the screw shaft 42.

If the walls of the depression 31 are straight and parallel, turning the thimble 52 through a given angle results in advance or retraction of the table 11 by a fixed amount and also in advance or retraction of the thimble itself by a fixed amount, and as a fixed movement of the table always results in a given change in taper measured in units of diameter relative to length, the scales 53 and 55 are linear. But for nonlinear results if desired for some reason, the walls of the depression 31 could be curved.

As an example of actual construction in the English system, the thread 43 may be left hand and 18 threads per inch and the thread 41 may be right hand and 8 threads per inch, and the axis of the shaft 42 may be 17.35 inches from the pivotal axis 25 of the table 11 to obtain a taper change of .250 inch per foot per revolution of the thimble 52. Also with the thread 43 left hand and the thread 41 right hand the sleeve 45 appears to move in the same direction relative to thimble 52 as does that end of the table, which is a desired convention. Every fifth mark of the graduations 53 may be numbered in both directions with a total of 25 marks, but this was difficult to do in the drawings. Angular change of the thimble 52 from one mark to the next would result in .010 inch per foot taper change.

It will thus be seen that there has been provided by this invention a micrometer adjuster in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A micrometer adjuster comprising a thimble, linearly proportioned scale graduations around the edge of said thimble calibrated directly in work piece taper expressed in diameter difference per unit length, a sleeve nut inside of the thimble, scale graduations on said sleeve nut which serve to read rotations of said sleeve nut and a line on said sleeve nut which serves to read the scale graduations around the edge of said thimble, a screw shaft to which said thimble is secured so that rotation of the thimble will rotate the shaft, a thread on the screw shaft in engagement with said sleeve nut, a second thread on said screw shaft spaced from the thread in engagement with said sleeve nut, a second nut in engagement with said second thread, an angularly movable element to which said sleeve nut is secured, a rigid bearing means for said screw shaft secured to said angularly movable element, a support for said element, a pivotal connection between said support and said element, a body of revolution secured to said second nut and a slot transverse to said screw shaft in said support in which said body of revolution nicely fits said slot being spaced from said pivotal connection, said body of revolution and said slot forming a slidable and angularly movable connection between said element and said support, the pitches of said threads being different, whereby relatively to move the second nut and the sleeve nut by turning said thimble and to read the amount of relative movement on the scale graduations in diameter difference per unit length and whereby to swivel said element to an ascertainable extent by turning said thimble.

2. A micrometer adjuster according to claim 1 in which the pitches of said threads are different in respect to being of opposite hand.

References Cited in the file of this patent

UNITED STATES PATENTS

| | | |
|---|---|---|
| 63,928 | Morse | Apr. 16, 1867 |
| 172,679 | Williamson | Jan. 25, 1876 |
| 240,557 | Soetbear | Apr. 26, 1881 |
| 780,520 | Brown | Sept. 9, 1902 |
| 1,596,702 | Williams | Aug. 17, 1926 |
| 1,644,221 | Angeletti | Oct. 4, 1927 |
| 2,132,924 | Belden | Oct. 11, 1938 |
| 2,136,958 | Tyson | Nov. 15, 1938 |
| 2,296,674 | Ingels | Sept. 22, 1942 |
| 2,397,300 | Tilton | Mar. 26, 1946 |
| 2,525,186 | Sosdian | Oct. 10, 1950 |
| 2,645,026 | Trbojevich | July 14, 1953 |